US010466887B2

(12) United States Patent
Nystrom

(10) Patent No.: US 10,466,887 B2
(45) Date of Patent: Nov. 5, 2019

(54) FEED AD SCROLLING

(71) Applicant: Facebook, Inc., Menlo Park, CA (US)

(72) Inventor: Ryan Michael Nystrom, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 193 days.

(21) Appl. No.: 15/585,043

(22) Filed: May 2, 2017

(65) Prior Publication Data

US 2018/0321812 A1 Nov. 8, 2018

(51) Int. Cl.
*G06F 3/0485* (2013.01)
*G06F 3/0482* (2013.01)
*G06F 3/0484* (2013.01)

(52) U.S. Cl.
CPC .......... *G06F 3/0485* (2013.01); *G06F 3/0482* (2013.01); *G06F 3/04845* (2013.01)

(58) Field of Classification Search
None
See application file for complete search history.

(56) References Cited

U.S. PATENT DOCUMENTS 6,471,588 B2 * 10/2002 Sakamoto ........... G07F 17/3265 273/143 R
2005/0024238 A1 * 2/2005 Kimura ................ G01C 21/367 340/995.1
2011/0032201 A1 * 2/2011 Naka ..................... G06F 3/0416 345/173
2012/0011464 A1 * 1/2012 Hayashi ............. H04N 1/00458 715/784
2012/0249456 A1 * 10/2012 Taka .................. G01C 21/3664 345/173
2012/0266068 A1 * 10/2012 Ryman .................. G06F 3/0485 715/719
2013/0235088 A1 * 9/2013 Miura ...................... G09G 5/34 345/684
2014/0136960 A1 * 5/2014 Borza ................... G06F 3/0485 715/247
2014/0181733 A1 * 6/2014 Oyanagi ............... G06F 3/0485 715/785
2014/0208260 A1 * 7/2014 Kawahara ........... G06F 3/04845 715/784
2016/0179322 A1 * 6/2016 Nagata .................. G06F 3/0485 715/784
2016/0364031 A1 * 12/2016 Yamamoto .......... G06F 3/03547
2017/0364228 A1 * 12/2017 Takai .................... G06F 3/0482

* cited by examiner

*Primary Examiner* — Howard Cortes
(74) *Attorney, Agent, or Firm* — Fenwick & West LLP

(57) ABSTRACT

A method for adjusting a landing position of a movable viewing-window of a device, to modify display of a content item at the landing position. A user of the device initiates scrolling along a feed of content items on the device. This scrolling input is used by the method to generate an initial scroll trajectory for movement of the viewing-window along the feed. Using this initial scroll trajectory, the method looks ahead to the landing position of the viewing-window with respect to the feed to determine the positioning of the content items that will be presented to the device user when scrolling is complete. The method identifies an adjustment to the viewing-window landing position to increase visibility of a content item in the viewing-window. The scroll trajectory is adjusted such that the viewing-window comes to a rest at the desired landing position, on a desired view of content items.

14 Claims, 7 Drawing Sheets

500

Input Mechanism: Finger Swipe

| | Swipe Velocity (cm/s) | Unadjusted Scroll Velocity (cm/s) | Unadjusted Scroll Deceleration (cm/s$^2$) | Unadjusted Scroll Distance (cm) | Unadjusted Landing Position (y-coordinate) | Adjust? | Adjusted Landing Position (y-coordinate) | Adjusted Scroll Distance (cm) | Adjusted Scroll Velocity (cm/s) | Adjusted Scroll Deceleration (cm/s$^2$) |
|---|---|---|---|---|---|---|---|---|---|---|
| 501 | 100 | 100 | 10 | 1000 | 0 | Yes | -3 | 1500 | N/A | 6.6 |
| 502 | 100 | 100 | 10 | 1000 | 0 | Yes | -3 | 1500 | 150 | N/A |
| 503 | 150 | 150 | 10 | 1500 | -3 | No | N/A | N/A | N/A | N/A |

FEED AD SCROLLING

BACKGROUND

This disclosure relates generally to adjusting a moveable viewing-window, and more specifically to automated adjustment of the landing position of the viewing-window to modify display of a content item at the landing position.

Users may initiate movement of the viewing-window to quickly move through a feed of content items on the display of a device and locate specific content items that interest them. This movement of the viewing-window is commonly referred to as "scrolling." Scrolling can be accomplished using a variety of input sensors including a keyboard, a mouse wheel, and a capacitive screen.

User engagement with a content provider, as well as with the specific content items provided, may be dependent upon the content items on which the viewing-window lands when scrolling stops. For example, if the user lands on a content item that they find interesting, the user may select that content item to examine more closely, and then continue to scroll through the content provider feed. On the other hand, if the user lands on an uninteresting content item, or a content item is only partially viewable within the screen, the user might choose to leave the content provider feed altogether. Content items seen by a user when scrolling stops are dependent upon the viewing-window landing position following the scroll. As a result, the landing position of the viewing-window following scrolling is essential to content-user interaction.

Existing landing position determination algorithms rely on dampening functions that enable scroll movement to gradually decelerate and come to a natural stop. This gradual slowing of movement makes the scroll appear natural to the user. This is an attractive solution because it makes the user feel as though they are in control of the scroll and the content that they see. However, this scroll deceleration algorithm is currently applied uniformly to all scrolls, and is inextensible to manipulation of scrolling based on presentation of desired content items. Therefore, this deceleration algorithm may result in presentation of less desirable content items, or presentation of content items in an undesirable format. For example, the viewing-window may stop on a content item that is irrelevant to the user, or only on the lower half of the content item such that the user cannot view the title of the content item. This may result in the user missing content items that may be of interest to them, and subsequently leaving the content provider feed as a result of disinterest.

SUMMARY

The user of a device can initiate scrolling along a feed or other visual organization of content items via a variety of input mechanisms. Some examples of input mechanisms include the wheel of a mouse, the buttons on a keyboard, or a finger applied to a capacitive screen. Scrolling input via these and other mechanisms is used by the device to generate an initial scroll trajectory for moving along the feed.

Using this initial scroll trajectory, the user device looks ahead to the landing position of a viewing-window with respect to the feed to determine the positioning of the content items that will be presented to the device user at that initial viewing-window when scrolling is complete. Based on the positioning of the content items, the user device identifies an adjustment to the viewing-window to increase visibility of one or more content items in the viewing-window. For example, to adjust the landing position of the viewing-window such that the viewing-window lands on a desirable content item located further down a feed of content items, the initial velocity of the viewing-window movement may be increased so that the landing position makes the desirable content item more visible. In this way, scroll trajectory can be intentionally adjusted such that the viewing-window comes to a rest at a desired landing position, and on a desired view of content items.

To ensure that the adjustment of the viewing-window does not appear obvious to the device user, the method can also incorporate various controls on the viewing-window adjustment such that the adjustment is consistent with a user's expectations. Using the viewing-window look-ahead and subsequent scroll trajectory adjustment, desirable content items can be presented to the user without the adjustments being observable and obvious to the device user. By adjusting the presentation of more desirable content items to the user, the desirable content items are not cut off or otherwise limited by portions of the feed, and the user is more likely to continue to engage with the provided content, and to continue to access the content provider feed.

BRIEF DESCRIPTION OF THE DRAWINGS

FIG. 5 is a data chart depicting different methods for the adjustment of a viewing-window landing position in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
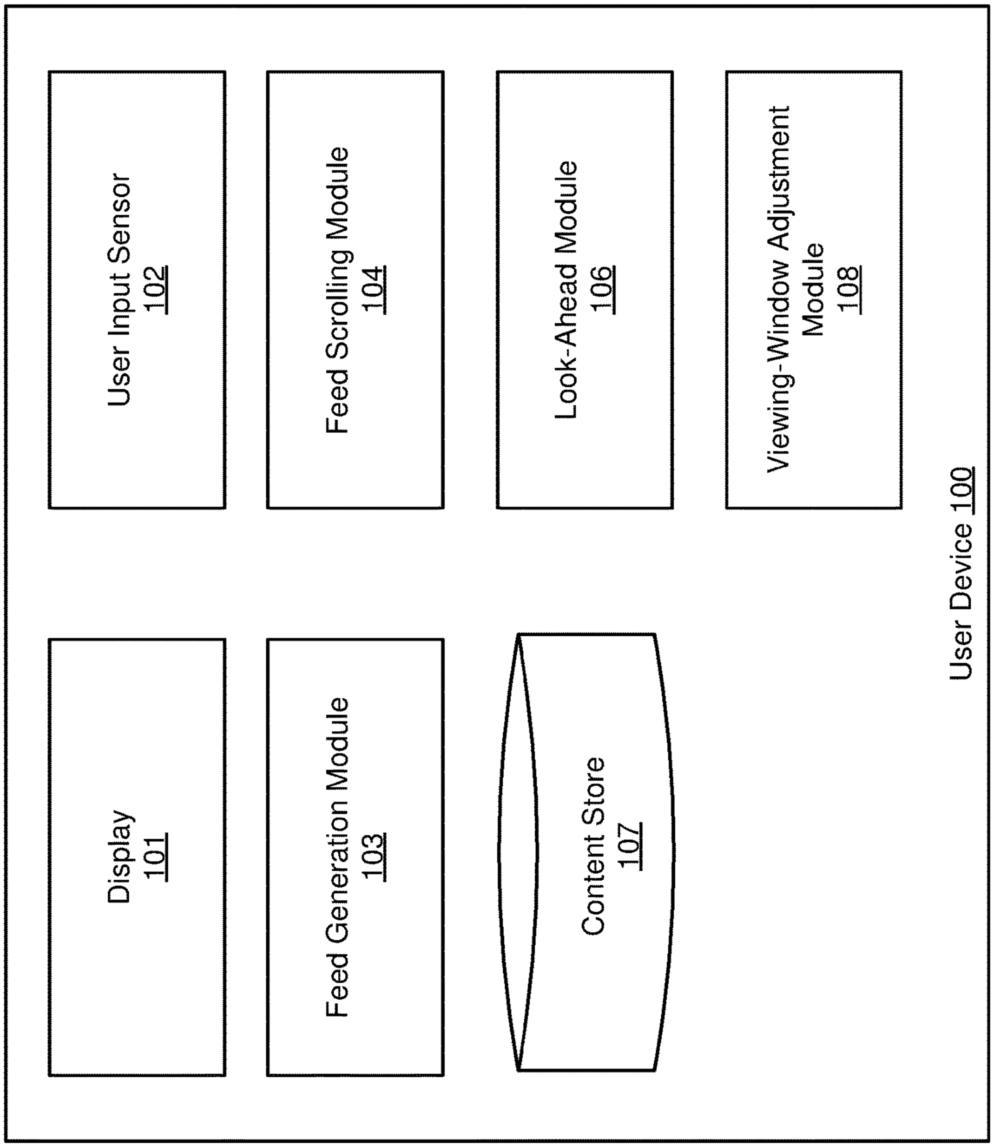
FIG. 1 illustrates a high level block diagram of a user device in which scrolling can be adjusted in accordance with an embodiment.

FIG. 1 is a high level block diagram of a user device 100 that adjusts scrolling of a viewing-window to change visibility of one or more content items in a feed. Adjusting the visibility of content items is beneficial to both the content user and content provider because it encourages and improves user engagement with the content item and reduces the chance that interesting content items are not overlooked because of the user's scrolling.

The user device 100 shown in FIG. 1 includes various components and modules to generate a viewing-window for a display and provide scrolling among content items in the display. The user device 100 comprises a display 101, a user input sensor 102, a feed generation module 103, a feed scrolling module 104, a look-ahead module 106, a content store 107, and a viewing-window adjustment module 108. In other embodiments, the user device 100 may include additional, fewer, or different components for various applications.

The user device 100 is a computing device capable of receiving user input and navigating among content items in a display. In one embodiment, a user device 100 is a computing device, such as a personal digital assistant (PDA), a mobile telephone, a smartphone, a tablet, or another suitable device. Alternatively, a user device 100 is a computer system, such as a desktop or laptop computer.

The content store 107 maintains various content items for presentation to a user. Each content item in the content store 107 may represent a single piece of content. Content items may be various types of content that a user wishes to browse through, and each has a visual representation of the content item. Examples include files in a file system, pictures, articles, news stories, events, journal entries, social media stories, products for sale, map locations, etc. The visual representation may be the content item itself (e.g., for a picture) or may be a brief description, summary, or other metadata of the content item (e.g., a summary of a news story or file name and file activity for files in a file browser). For convenience herein, when a visual representation of a content item is displayed to a user in a feed, the visual representation may be referred to as showing or displaying the content item.

The content store 107 may be updated as content items are added to or removed from the user device, such as to a folder or other organization of data on the user device 100. The content items in the content store 107 may also be retrieved and updated from external sources, such as a social networking system, a news service, or another external provider that provides content for user consumption. User device 100 may include an application or other process that communicates with the external source to update the content store 107. Updates to content store 107 can occur statically, dynamically or automatically.

The feed generation module 103 generates a feed of content items for display on the user device display 101. A feed is a set of content items with designated locations for each content item to be displayed in the feed. The feed generation module 103 can be either external or internal to the user device 100. Feeds can be generated by the feed generation module 103 either automatically or at the request of the device user. In one embodiment, the feed generation module 103 generates the feed, retrieves content items to be displayed in the feed from the content store 107, and places the content items at the designated locations within the feed. In an alternative embodiment, the feed is retrieved from an external source. In one embodiment, content items may be placed in the feed in a random order. In an alternative embodiment, content items may be placed at locations within the feed using a specified ordering. For example, each content item may be associated with some score, ranking, or importance that the feed generation module uses to generate the ordering of content items within the feed. Finally, the generated feed of content items is displayed to the user on user device display 101.

The user device display 101 has limited display space, and as such may show only a subset of the content items in a feed. The area of the feed presented to the user at one time on the device display 101 is referred to as a "viewing-window." To browse content items in the feed that are not within the viewing-window, the viewing-window can be moved along the feed. This movement of the viewing-window along the feed to contain different subsets of content items is referred to "scrolling." Thus, a device user may navigate among the content items in the feed by scrolling the feed to various locations at which the content items are displayed.

The user input sensor 102 is a mechanism that can be used to provide input to the user device 100. In the case of the subject matter disclosed here, the user input sensor 102 functions as a scrolling instrument. In other words, by providing input to the user input sensor 102, the user can control the movement of the viewing-window along the feed. The user input sensor 102 can be either internal or external to the user device 100. Examples of a user input sensor 102 may include the wheel of a mouse, the buttons on a keyboard, or a capacitive screen.

The scrolling action is performed by the feed scrolling module 104. The feed scrolling module 104 uses the user's input obtained from the user input sensor 102 to move the viewing-window along the feed generated by the feed generation module 103 such that it appears as though the feed is moving across the display 101.

A user may scroll through a feed as a way of browsing for specific content items. If the viewing-window lands on a content item that interests the user, the user may select that content item to view more closely. After viewing the content item of interest, the user might then continue to scroll through the feed in search of additional content items of interest. On the other hand, if the viewing-window lands on a content item that is uninteresting to the user, the user may decide to stop scrolling and exit the feed altogether. In another scenario, the viewing-window may land at a position such that a portion of the content item lies outside of the viewing-window. In other words, the entire content item is not visible within the viewing-window. The presentation of this content item might also persuade the user to exit the feed. In this way, the subject matter and formatting of the content items presented to the user through the viewing-window of the device are important in determining user engagement with the feed, as well as with the individual content items presented in the feed. In turn, the subject matter and formatting of the content items presented within the viewing-window are dependent upon the resting position of the viewing-window following scrolling. The resting position of the viewing-window following scrolling is termed the "landing position." Thus, user engagement with the feed and its content can depend on the landing position of the viewing-window after scrolling.

The look-ahead module 106 in combination with the viewing-window adjustment module 108 enables adjustment of the viewing-window's landing position and thus selection of the content items presented in the viewing-window or adjustment of the viewing-window to improve or change the visibility of the content items in the viewing-window. When a user initiates scrolling, the look-ahead module 106 pre-determines the unadjusted landing position of the viewing-window before the scroll is complete. That is, the adjustment of the scrolling is determined before the scroll completes, and in some embodiments the scroll may initially begin while the adjustment is determined, so that the user's perception of timely scrolling may continue, while the scroll itself is still adjusted. In other examples, the scroll does not begin until the adjustment is determined, which may not impact the user experience when the adjustment can be quickly determined. If the look-ahead module 106 predicts an undesirable landing position based on the presentation of content items within the viewing-window, the viewing-window adjustment module 108 adjusts the landing position to a more desirable location in the feed. The look-ahead module 106 and the viewing-window adjustment module 108 can be embodied in many different forms. For example, these modules may be incorporated as an operating system feature, as a separate component of an application, or within another piece of infrastructure within the user device 100. The operation of the look-ahead module 106 and the viewing-window adjustment module 108 are described in greater detail with regard to FIG. 2 and FIG. 4.

Figure 2:
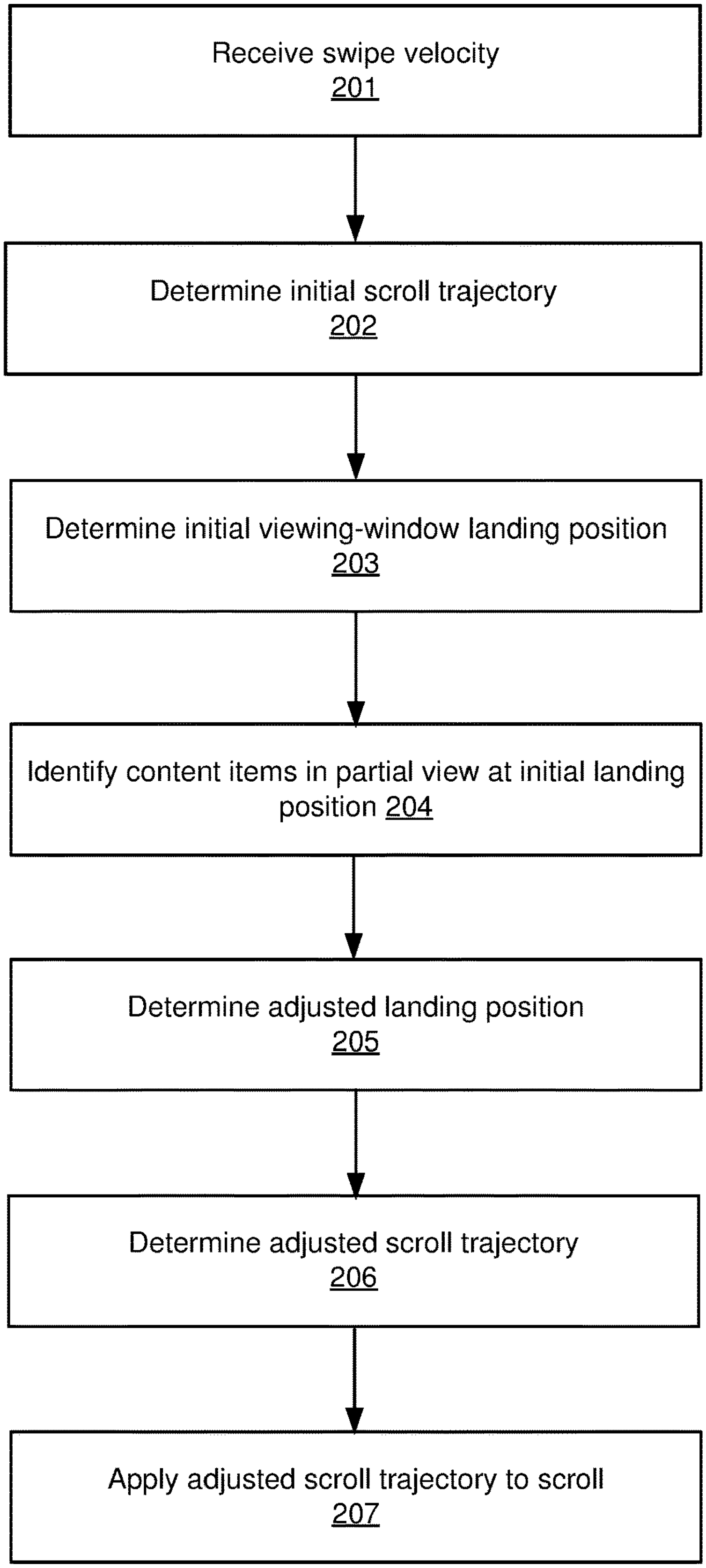
FIG. 2 is a flow chart of a method for adjusting the landing position of the viewing-window prior to the completion of a given scroll in accordance with an embodiment.

FIG. 2 is a flow chart of one embodiment of a method for adjusting the landing position of the viewing-window prior to the completion of a given scroll. In other embodiments, the method may include different and/or additional steps than those shown in FIG. 2. Additionally, steps of the method may be performed in different orders than the order described in conjunction with FIG. 2 in various embodiments.

First, the look-ahead module 106 receives a swipe velocity 201 from the feed scrolling module 104. Swipe velocity is one embodiment of a scroll parameter that can be used to determine the scroll trajectory and resulting landing position of the viewing-window after a given scroll. The feed scrolling module 104 may pass any parameter or plurality of parameters describing the scroll to the look-ahead module 106. For example, rather than velocity, the parameter used might be frequency or acceleration. Furthermore, the source of the scroll parameter is not limited to a "swipe," which suggests that the user input is a finger applied to a capacitive screen. The scroll parameter may be derived from any form of user input sensor 102. For example, the scroll parameter may be derived from a button press or the movement of a mouse wheel.

Next, the swipe velocity 201, or any alternative scroll parameter, is used by the look-ahead module 106 to determine the initial scroll trajectory 202. The concept of a scroll trajectory is described in greater detail with regard to FIG. 3A.

Figure 3A:
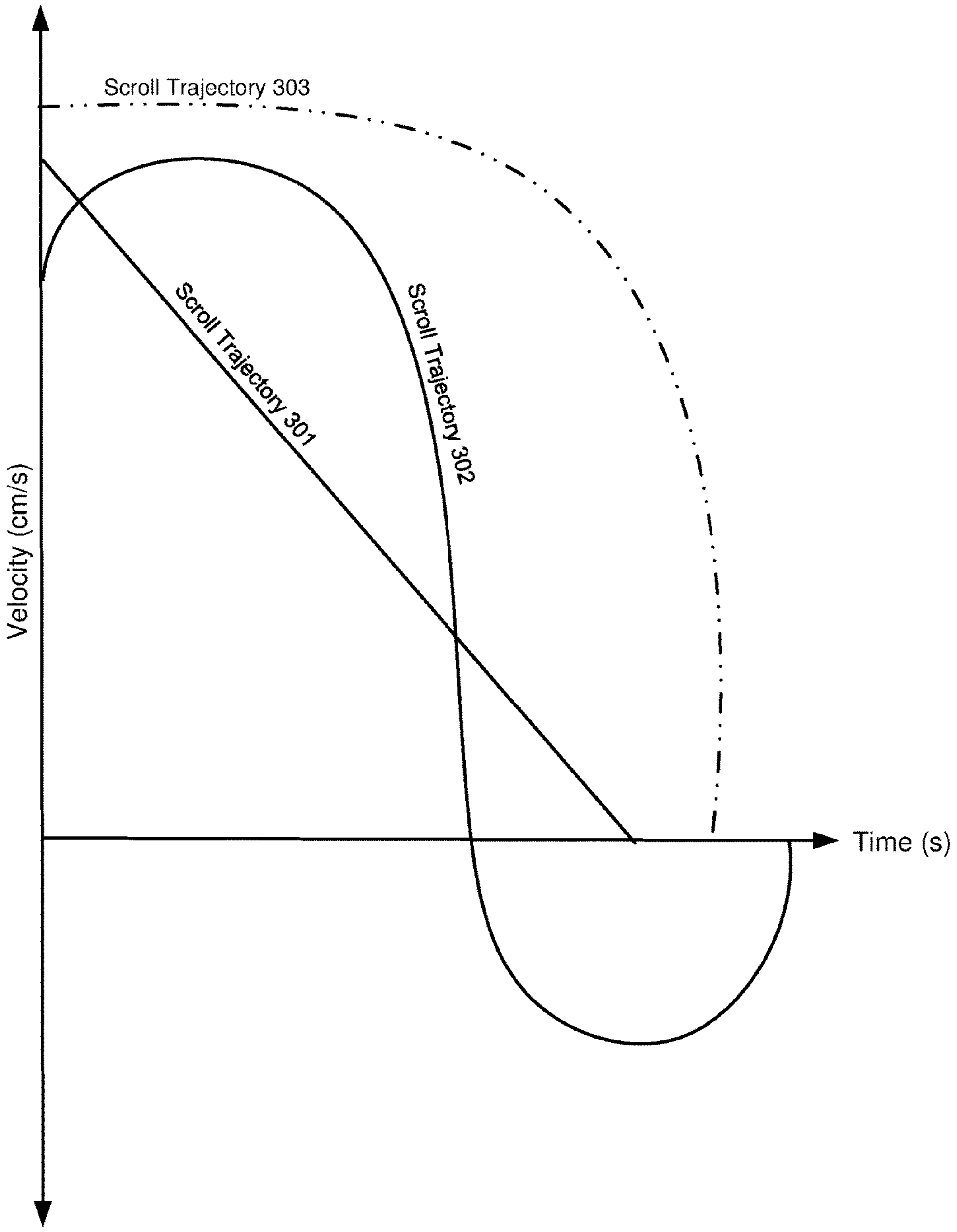
FIG. 3A illustrates different scroll trajectories in accordance with one embodiment.

FIG. 3A illustrates three examples of scroll trajectories 301, 302, and 303. The scroll trajectory describes the velocity of movement of the viewing-window in the feed over time to implement for the user's scroll input. In various example implementations, the velocity of a scroll may change over time according to various functions as shown by these example scroll trajectories of FIG. 3A. Scroll trajectories are dependent on a set of parameters that describe a given scroll, and determine the viewing-window landing position that results from the given scroll. The set of parameters that describe the scroll and determine the scroll trajectory may be determined from the user input sensor 102 and default settings of the user device 110. These default settings may be specified by the feed scrolling module 104, an operating system of the user device 110, a separate component of an application, or an external source.

The scroll trajectories of FIG. 3A illustrate how their respective scroll velocities change over time. In the case of scroll trajectory 301, velocity decreases at a constant rate. In the case of scroll trajectory 302, velocity increases gradually, decreases rapidly, and then increases gradually again. Finally, in the case of scroll trajectory 303, velocity decelerates slowly and then more quickly drops off. As a result of these varying velocity profiles, each scroll trajectory illustrated in FIG. 3A may produce a different viewing-window landing position.

The scroll trajectories 301, 302, and 303 depicted in FIG. 3A provide different changes in velocity over time. However, a scroll trajectory may be dependent on any parameter describing the scroll. Parameters that affect scroll trajectory include but are not limited to distance of the scroll, acceleration of the scroll, and frequency of the scroll request. Thus scroll trajectories, and by extension viewing-window landing positions, may depend on a variety of scroll parameters.

Referring back to FIG. 2, using the initial scroll trajectory 202, the initial viewing-window landing position 203 is determined. Next, look-ahead module 106 uses the feed generated by the feed generation module 103 to identify the content items in partial view located at the initial viewing-window landing position 203. The content items in partial view may be used to adjust the viewing-window landing position. Identification of content items in partial view 204 is one embodiment of information used to determine appropriate viewing-window adjustment. Additional or alternative pieces of information regarding the content items shown in the viewing-window may be used. For example, the subject matter of the content items or the pre-determined relevance of the content items to the device user may be considered in determining which adjustments to make and which content items to more-centrally locate in the viewing-window.

If the look-ahead module 106 identifies content items in partial view at the initial viewing-window landing position 204, the landing position of the viewing-window is adjusted. To adjust the landing position, the look-ahead module 106 uses the feed generated by the feed generation module 103 to determine a desired, adjusted landing position of the viewing-window 205 at which desired content items are more fully displayed in the viewing-window. Again, adjustment of the landing position of the viewing-window 205 based on the visibility of content items is one embodiment of information used to determine how to adjust the viewing-window. Additional or alternative pieces of information regarding the content items shown in the viewing-window may be used to determine an adjusted viewing-window landing position.

Using the adjusted landing position 205, the viewing-window adjustment module 108 determines the adjusted scroll trajectory 206. The concept of an adjusted scroll trajectory is described in greater detail with regard to FIG. 3B.

Figure 3B:
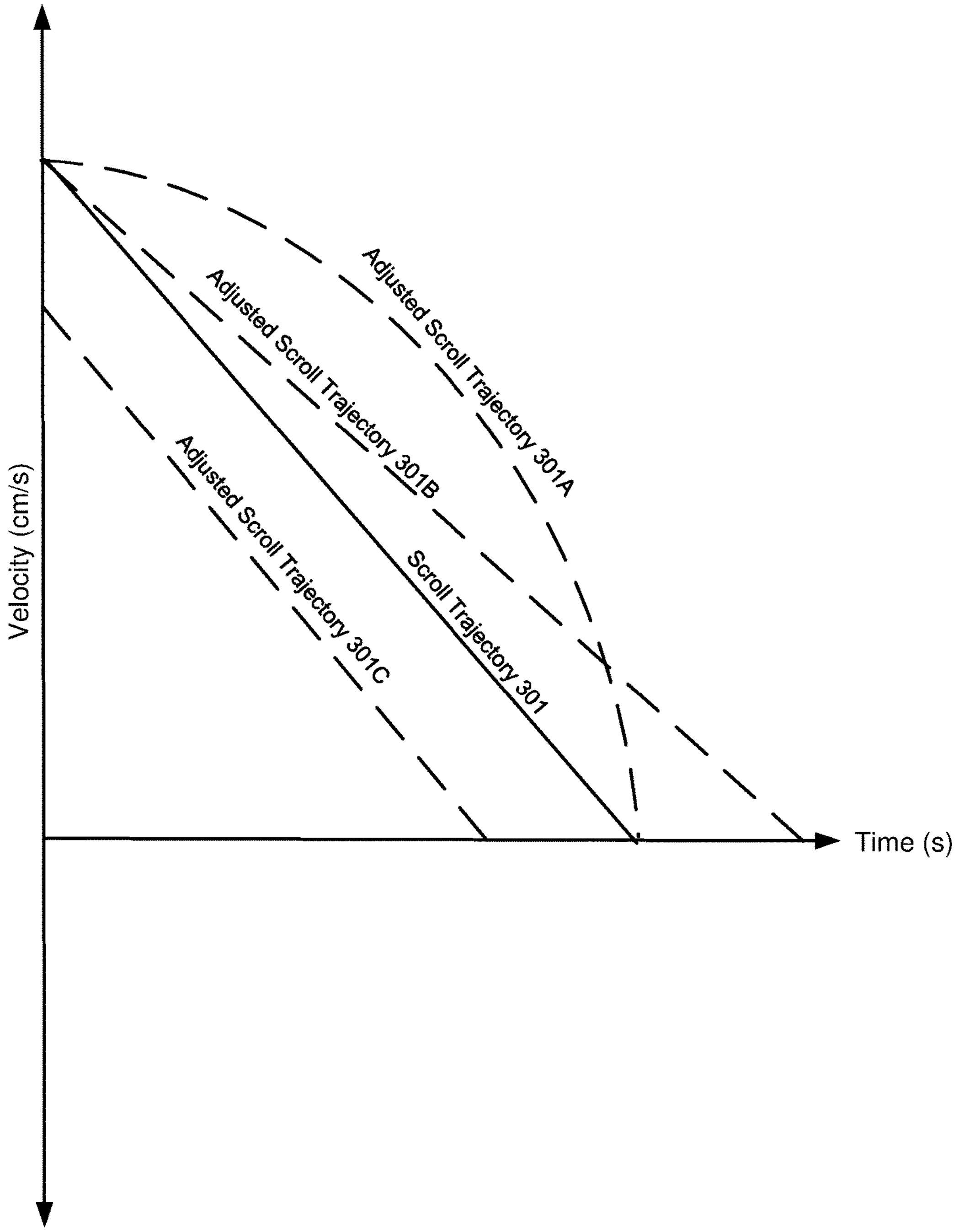
FIG. 3B illustrates different scroll trajectory adjustments in accordance with one embodiment.

FIG. 3B illustrates examples of three adjusted scroll trajectories 301A, 301B, and 301C that have been adjusted from the original scroll trajectory 301 shown in FIGS. 3A and 3B. To achieve the adjusted scroll trajectory 301A, scroll trajectory 301 is modified such that its scroll velocity decreases more slowly initially, and then more rapidly, such that the function for generating the scroll trajectory may be modified to the function used for generating scroll trajectory 303 in FIG. 3A. The initial scroll velocity and duration of the scroll remains the same for adjusted scroll trajectory 301A. In the case of adjusted scroll trajectory 301B, the scroll velocity relative to scroll trajectory 301 still decreases at a constant rate and the initial scroll velocity remains unchanged, and a parameter of the scroll is adjusted to decrease the rate at which the velocity decreases (e.g., the "drag" on the scroll velocity). However, the resulting duration of the scroll is increased, rendering the change in scroll velocity of adjusted scroll trajectory 301B more gradual than the change in scroll velocity of scroll trajectory 301. Finally, adjusted scroll trajectory 301C demonstrates the same rate of change (e.g., "drag") of scroll velocity as scroll trajectory 301. However, adjusted scroll trajectory 301C has a reduced initial scroll velocity, and thus the scroll duration for adjusted scroll trajectory 301C is shorter than that of scroll trajectory 301. Accordingly, the parameters for scroll trajectory 301 may be modified in various ways to adjust the scroll trajectory and effect an adjusted landing position in a scroll.

As previously described, scroll trajectory determines the landing position of the viewing-window following the given scroll. Thus adjustment of scroll trajectory adjusts the viewing-window landing position. For example, adjustment of scroll trajectory 301 to become scroll trajectory 301A or 301B may result in the viewing-window landing position moving further down the feed. On the other hand, adjustment of scroll trajectory 301 to become scroll trajectory 301C may result in the viewing-window landing position falling closer to the starting position relative to the unadjusted landing position. Thus by adjusting a given scroll trajectory, a new landing position can be reached.

Adjusted scroll trajectories 301A, 301B, and 301C are generated by modifying scroll parameters of scroll 301. These parameters include initial scroll velocity, duration of the scroll, and rate of change of scroll velocity. Manipulation of scroll parameters is one method that may be used to alter scroll trajectory. In another embodiment the feed itself, such as the ordering of content items, or the height of the feed, is adjusted. In yet another embodiment, the landing position is not adjusted. In another embodiment, the adjustment of the viewing-window is subject to some limitation or threshold value such that the adjustment is not obvious to the device user. For example, vertical translation of the viewing-window may be limited to a distance of 3 mm such that the device user does not perceive the adjustment. The adjustments may also be subject to randomization to further prevent the device user from noticing the adjustments. For example, the distance by which the viewing-window vertically translates may be affected by a randomized value, such that content items do not always land exactly at the top or the bottom of the viewing-window.

Referring back to FIG. 2, once the adjusted scroll trajectory 206 is determined, the adjusted scroll trajectory is applied to the scroll 207 by the feed scrolling module 104.

Figure 4:
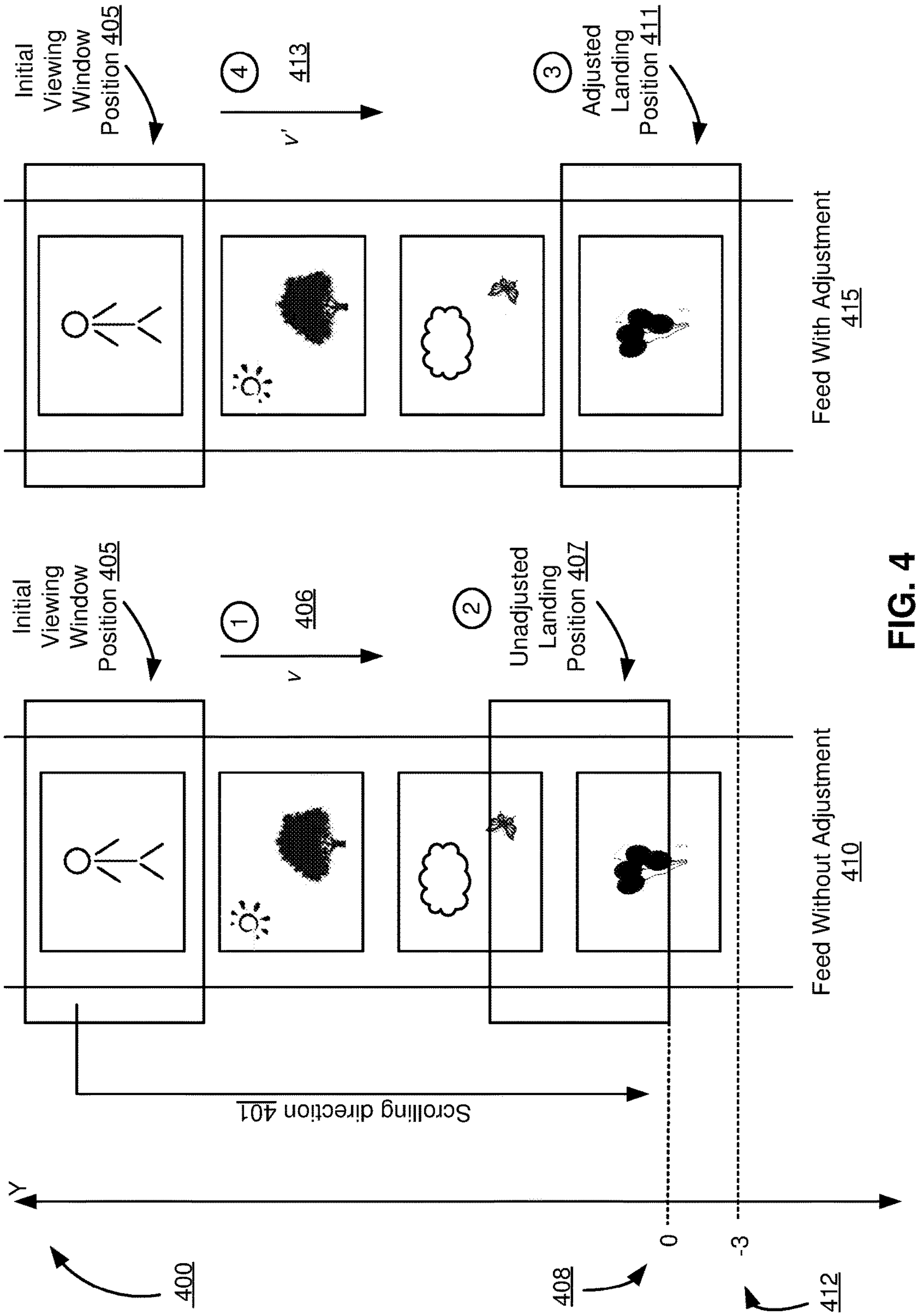
FIG. 4 illustrates the process of adjusting the landing position of a viewing-window in a feed in accordance with one embodiment.

FIG. 4 is a diagram illustrating the process of adjusting the landing position of a viewing-window as the viewing-window moves down the y-axis 400 of a one dimensional feed. FIG. 4 also provides a visual comparison of scrolling without a landing position adjustment 410 to scrolling with a landing position adjustment 415. As seen in FIG. 4, scrolling is initiated in a scrolling direction 401 from an initial viewing-window position 405.

In the version of scrolling without viewing-window landing position adjustment 410, the viewing-window travels at velocity 406 in the scrolling direction 401. When scrolling is complete, the viewing-window lands at an unadjusted landing position 407 at y-coordinate 408.

In the version of scrolling with adjustment of the viewing-window landing position 415, when scrolling is initiated in the scrolling direction 401 from the initial viewing-window position 405, the look-ahead module 106 uses the scroll velocity 406 to pre-determine the unadjusted landing position of the viewing-window 407 before scrolling is complete. The look-ahead module 106 then identifies the content items that would be presented in the viewing-window at unadjusted landing position 407, and determines whether an adjustment of the viewing-window landing position is needed. This step also occurs before scrolling is complete.

In the example depicted in FIG. 4, adjustment of the landing position of the viewing-window is indicated when the content items displayed in the viewing-window are only in partial view. As mentioned with regard to FIG. 2, in alternative embodiments the look-ahead module 106 can be programmed to adjust or not adjust the landing position of the viewing-window based on various characteristics of the content items displayed. For example, the look-ahead module 106 may be programmed to adjust the landing position such that the viewing-window increases the visibility of a particular type of content, such as sponsored content, or videos, photos, or other content having a comparatively high relevance score to the user.

In the example of FIG. 4, at the unadjusted landing position 407 the viewing-window displays incomplete portions of two content items. The look-ahead module 106 identifies that the viewing-window will display the partial content items using the initial scroll trajectory 406, and thus determines an adjusted landing position 411.

To adjust the landing position of the viewing-window, the look-ahead module 106 determines the desired landing position and the corresponding y-coordinate of the adjusted landing position 411 in the feed. In this example, the desired landing position is one which enables the viewing-window to include a complete content item. Thus the desired landing position is determined to be adjusted landing position 411 at y-coordinate 412. As previously mentioned, in alternative embodiments the look-ahead module 106 can be programmed to adjust the landing position of the viewing-window in different ways depending upon criteria specified for the content items and programmer preference. Adjustment may be subject to thresholds, limitations, randomization, bounds, or any other mechanism to prevent the device user from noticing the adjustment. For example, the adjustment may offset a centered content item by a random number of pixels such that a content item is not completely centered on the page each time the user scrolls. In another embodiment, the adjustment changes the landing position such that a content item is visible in the viewing-window only if the initial viewing-window landing position would have displayed at least 50% of the content item without any adjustment. These adjustments may also differ based on the type of content item, for example to adjust a sponsored content item more or less than other types of content items. In addition, the viewing-window adjustment may be limited by a maximum amount or percentage of the initial distance along the feed moved by the initial scroll. For example, the viewing-window may not be permitted to move more than 15 or 20% of the scrolling distance or velocity initially determined for the user's input. These parameters for viewing-window adjustment may be applied simultaneously or separately to control the viewing-window adjustment.

To reach the adjusted landing position 411, the viewing-window adjustment module 108 assigns a new scroll velocity 413 to the viewing-window. In alternative embodiments, the viewing-window adjustment module 108 may indicate a change in any of the scroll parameters to achieve the adjusted landing position 411. For example, the scroll function, or deceleration may be changed instead. Such variations are described in more detail with regard to FIG. 5. Finally, the feed scrolling module 104 initiates the prescribed scroll velocity 413, and the viewing-window lands at the adjusted viewing position 411 where the content item is displayed in its entirety.

To maintain operation of the scroll that appears familiar to the user's expected scroll (e.g., the user's expected scroll given the input from the user), the viewing-window landing position and modified scroll trajectory are determined and applied prior to the completion of the original scroll. In one embodiment, the landing position is adjusted prior to the commencement of viewing-window movement. In another embodiment, the landing position is adjusted during the scroll itself by changing the trajectory of a scroll while the scroll is in process.

Figure 6:
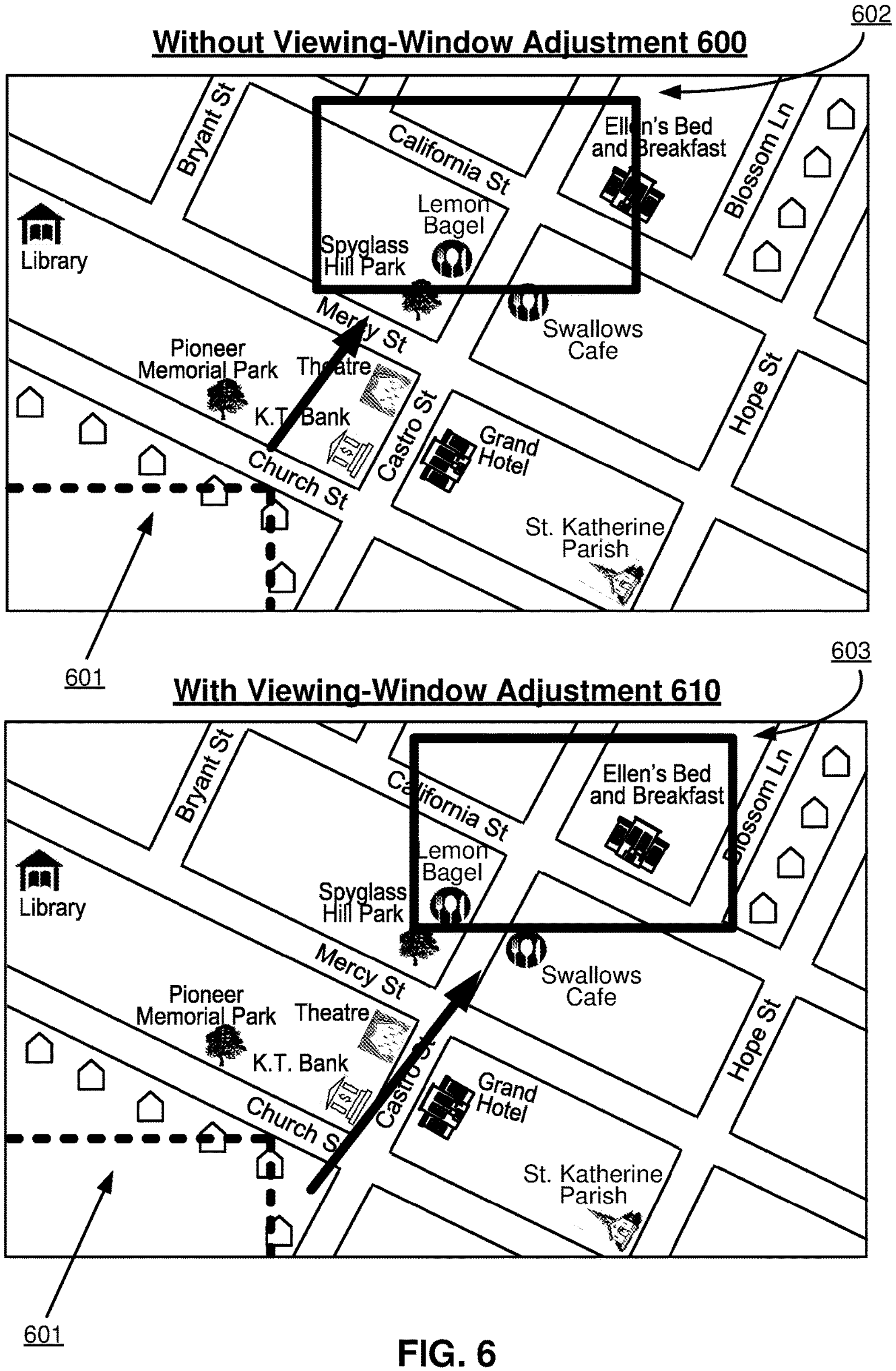
FIG. 6 illustrates the process of adjusting the landing position of a viewing-window in a visual organization of content items in accordance with one embodiment.

FIG. 4 depicts scrolling as occurring in only one scrolling direction 401. However in alternative embodiments scrolling may occur in multiple directions along any axis of the feed or a visual organization of content items. Furthermore, FIG. 4 depicts the adjustment of the viewing-window landing position for a one dimensional feed. However alternative embodiments may exist in two or three dimensional visual organization of content items. An example of viewing-window landing position adjustment in a two dimensional visual organization of content items is shown in FIG. 6.

FIG. 5 includes a data chart 500 depicting three different means by which the adjusted landing position 411 can be reached. Specifically, each row within the data chart 500 provides a set of initial and adjusted scroll parameter values that produce the landing position adjustment illustrated in FIG. 4. Thus each row demonstrates a different possible method for the adjustment of the viewing-window landing position.

Method 502 assigns a value of 100 cm/s to unadjusted scroll velocity 406. The unadjusted landing position y-coordinate 408 is set to a value of 0 as in FIG. 4. At this landing position, two content items are in partial view. To display the entirety of one of the content items, the viewing-window is moved to the adjusted landing position y-coordinate 412. To adjust the landing position of the viewing-window to y-coordinate 412 subject to the given unadjusted scroll deceleration and unadjusted scroll distance, the adjusted scroll velocity 413 must be 150 m/s as shown in FIG. 5.

Rather than adjusting the scroll velocity as in scenario 502, the scroll deceleration is adjusted in method 501. To adjust the landing position of the viewing-window to y-coordinate 412 subject to the given unadjusted scroll velocity and unadjusted scroll distance, the adjusted scroll deceleration 501A must be 6.6 $cm/s^2$ as shown in FIG. 5.

In method 503 the unadjusted scroll velocity is set at 150 cm/s, and thus the unadjusted landing position y-coordinate already equals the desired value of −3. In other words, without any landing position adjustment, the viewing-window lands in the right position. Thus the look-ahead module 106 decides that there is no need to adjust the landing position 503A and as a result none of the scroll parameters are changed.

FIG. 5 provides a few examples of means by which the desired landing position 411 can be achieved. However, the examples shown in FIG. 5 are not exhaustive. Any combination of parameters describing the scroll trajectory can be modified to achieve the desired landing position 411. For example, in an alternative embodiment, content items may be swapped or moved to different locations within the feed to achieve a desired viewing-window landing position.

FIG. 6 is a diagram illustrating the process of adjusting the landing position of a viewing-window in a multidimensional visual organization of content items. In this example, the visual organization of content items shown is a two-dimensional map. This is one embodiment of a visual organization of content items in which a viewing-window landing position may be adjusted. The disclosed method for landing position adjustment can be used in any type of single or multidimensional visual organization of content items. For example, adjustment of a viewing-window landing position may also be desirable and similarly implemented in a three dimensional virtual reality world.

FIG. 6 also provides a visual comparison of scrolling in a two dimensional visual organization of content items without a viewing-window adjustment 600 and scrolling in a two dimensional visual organization of content items with a viewing-window adjustment 610. The area encompassed by the dotted line 601 depicts the initial position of the viewing-window. The arrow depicts the movement, or scrolling, of the viewing-window within the visual organization of content items.

In the illustration in which the viewing-window landing position is not adjusted 600, the viewing-window 602 presents only a partial view of Ellen's Bed and Breakfast. In one scenario, the content item for "Ellen's Bed and Breakfast" may be preferred for placement within the viewing-window. For example, Ellen's Bed and Breakfast may be a type of content item preferenced for placement in the viewing-window, such as because of its category or type of content. Thus the landing position of viewing-window 602 may be adjusted such that Ellen's Bed and Breakfast is displayed in its entirety within the viewing-window. The content provider may use the disclosed subject matter move the viewing-window 602 to the adjusted landing position of viewing-window 603 as shown in the scenario with viewing-window adjustment 610.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

identifying an initial scroll trajectory for a viewing-window displaying a first portion of a feed of content items on a display, the initial scroll trajectory describing a movement path of the viewing-window in the feed;

prior to movement of the viewing-window in the feed according to the initial scroll trajectory:

determining, from the initial scroll trajectory, an initial landing position of the viewing-window in the feed of content items;

identifying a content item to be displayed in the viewing-window at the initial landing position;

determining an adjustment of the initial landing position to a desired landing position based on a visibility of the content item within the viewing-window at the initial landing position;

determining, from the desired adjustment of the initial landing position to a desired landing position, an adjusted scroll trajectory from the initial scroll trajectory;

applying the adjusted scroll trajectory to the movement path of the viewing-window in the feed; and moving the viewing-window in the feed to the desired landing position according to the movement path.

2. The method of claim 1, wherein the initial scroll trajectory is determined from a user input.

3. The method of claim 1, wherein the adjustment of the viewing-window landing position, based on the adjustment of the initial scroll trajectory, is constrained such that the adjustment does not exceed a threshold percentage of a total distance of the initial scroll trajectory.

4. The method of claim 1, wherein the adjustment of the viewing-window landing position is further based on a random value.

5. The method of claim 1, wherein the adjustment of the initial landing position to a desired landing position increases the visibility of the content item within the viewing-window at the initial landing position.

6. A method comprising:

identifying an initial scroll trajectory for a viewing-window displaying a first portion of a visual organization of content items on a display, the initial scroll trajectory describing a movement path of the viewing-window in the visual organization of content items;

prior to movement of the viewing-window in the feed according to the initial scroll trajectory:

determining, from the initial scroll trajectory, an initial landing position of the viewing-window in the visual organization of content items;

identifying a content item to be displayed in the viewing-window at the initial landing position;

determining an adjustment of the initial landing position to a desired landing position based on a visibility of the content item within the viewing-window at the initial landing position;

determining, from the desired adjustment of the initial landing position to a desired landing position, an adjusted scroll trajectory from the initial scroll trajectory;

applying the adjusted scroll trajectory to the movement path of the viewing-window in the visual organization of content items; and moving the viewing-window in the feed to the desired landing position according to the movement path.

7. The method of claim 6, wherein the initial scroll trajectory is determined from a user input.

8. The method of claim 6, wherein the adjustment of the viewing-window landing position, based on the adjustment of the initial scroll trajectory, is constrained such that the adjustment does not exceed a threshold percentage of a total distance of the initial scroll trajectory.

9. The method of claim 6, wherein the adjustment of the viewing-window landing position is further based on a random value.

10. The method of claim 6, wherein the adjustment of the initial landing position to a desired landing position increases the visibility of the content item within the viewing-window at the initial landing position.

11. A non-transitory computer-readable medium having instructions for execution by a processor causing the processor to:

identify an initial scroll trajectory for a viewing-window displaying a first portion of a feed of content items on a display, the initial scroll trajectory describing a movement path of the viewing-window in the feed;

prior to movement of the viewing-window in the feed according to the initial scroll trajectory:

determine, from the initial scroll trajectory, an initial landing position of the viewing-window in the feed of content items;

identify a content item to be displayed in the viewing-window at the initial landing position;

determine an adjustment of the initial landing position to a desired landing position based on a visibility of the content item within the viewing-window at the initial landing position;

determine, from the desired adjustment of the initial landing position to a desired landing position, an adjusted scroll trajectory from the initial scroll trajectory;

apply the adjusted scroll trajectory to the movement path of the viewing-window in the feed; and moving the viewing-window in the feed to the desired landing position according to the movement path.

12. The non-transitory computer-readable medium of claim 11, wherein the initial scroll trajectory is determined from a user input.

13. The non-transitory computer-readable medium of claim 11, wherein the adjustment of the viewing-window landing position is further based on a random value.

14. The non-transitory computer-readable medium of claim 11, wherein the adjustment of the initial landing position to a desired landing position increases the visibility of the content item within the viewing-window at the initial landing position.

* * * * *